(12) United States Patent
Zhang et al.

(10) Patent No.: US 12,540,254 B2
(45) Date of Patent: Feb. 3, 2026

(54) EPOXY COMPOSITIONS AND METHODS OF USE

(71) Applicant: Ennis-Flint, Inc., Greensboro, NC (US)

(72) Inventors: Tao Zhang, Colfax, NC (US); Gerald Vandezande, Raleigh, NC (US); Phillip H. Madison, IV, Trinity, NC (US)

(73) Assignee: Ennis-Flint, Inc., Greensboro, NC (US)

( * ) Notice: Subject to any disclaimer, the term of this patent is extended or adjusted under 35 U.S.C. 154(b) by 72 days.

(21) Appl. No.: 16/448,026

(22) Filed: Jun. 21, 2019

(65) Prior Publication Data

US 2019/0390079 A1    Dec. 26, 2019

Related U.S. Application Data (60) Provisional application No. 62/688,535, filed on Jun. 22, 2018.

(51) Int. Cl.
| | |
|---|---|
| *C09D 163/00* | (2006.01) |
| *C08G 59/24* | (2006.01) |
| *C08G 59/42* | (2006.01) |
| *C08G 59/68* | (2006.01) |
| *C09D 5/33* | (2006.01) |
| *F04B 15/04* | (2006.01) |

(52) U.S. Cl.
CPC ......... *C09D 163/00* (2013.01); *C08G 59/245* (2013.01); *C08G 59/4207* (2013.01); *C08G 59/687* (2013.01); *C09D 5/004* (2013.01); *F04B 15/04* (2013.01)

(58) Field of Classification Search
CPC .......................... C09D 163/00; C08G 59/687
See application file for complete search history.

(56) References Cited

U.S. PATENT DOCUMENTS

| | | | |
|---|---|---|---|
| 3,018,262 A | 1/1962 | Schroeder | |
| 4,088,633 A | 5/1978 | Gurney | |
| 4,499,215 A * | 2/1985 | Okada | C08L 61/06 523/450 |
| 4,668,736 A | 5/1987 | Robins et al. | |
| 4,835,241 A * | 5/1989 | Waddill | C08G 59/50 528/111 |
| 5,367,027 A * | 11/1994 | Fushimi | B05D 7/532 525/194 |

(Continued)

FOREIGN PATENT DOCUMENTS

| | | |
|---|---|---|
| WO | 95/18168 A1 | 7/1995 |
| WO | 2006/052727 A1 | 5/2006 |

OTHER PUBLICATIONS

Lee et al., "Handbook of Epoxy Resins", McGraw-Hill Book Company, New York, 1967, Chapter 2, pp. 2-33.

*Primary Examiner* — Megan McCulley (57) ABSTRACT

This disclosure relates to epoxy compositions and more particularly to two-part epoxy compositions that are useful for marking substrates, such as roadway and airport runway surfaces. The compositions and methods described herein can reduce build-up on applicator pump seals. Such build-up can lead to pump failure. In some cases, the compositions can reduce down-time due to pump failure. However, the compositions retain the necessary properties for substrate marking, such as curing within a short period of time.

20 Claims, 5 Drawing Sheets

(56) References Cited

U.S. PATENT DOCUMENTS

| | | |
|---|---|---|
| 5,405,688 A | 4/1995 | Decker et al. |
| 5,731,369 A | 3/1998 | Mahoney |
| 6,153,719 A | 11/2000 | Abbey et al. |
| 6,242,083 B1 | 6/2001 | McGrail et al. |
| 6,572,971 B2 | 6/2003 | Martin |
| 6,632,893 B2 | 10/2003 | Konarski et al. |
| 6,887,574 B2 | 5/2005 | Dean et al. |
| 7,037,958 B1 | 5/2006 | Hansen et al. |
| 7,163,973 B2 | 1/2007 | Ahsan |
| 9,376,528 B2 | 6/2016 | Marks |
| 2002/0082344 A1* | 6/2002 | Ishihara .................. B05D 7/532 525/29 |
| 2003/0064228 A1* | 4/2003 | Oosedo .................... C08J 3/244 428/413 |
| 2005/0171237 A1 | 8/2005 | Patel et al. |
| 2005/0244124 A1* | 11/2005 | Shelnut .................. G02B 6/138 385/129 |
| 2006/0141230 A1* | 6/2006 | Miyoshi .................... C23C 2/26 428/216 |
| 2006/0293172 A1 | 12/2006 | Rubinsztajn et al. |
| 2007/0015893 A1* | 1/2007 | Hakuta .................. C08F 210/18 528/34 |
| 2007/0298178 A1* | 12/2007 | Tanabe .................. C08F 220/32 427/372.2 |
| 2012/0010330 A1* | 1/2012 | Dettloff .................... C08L 63/00 523/466 |
| 2014/0213755 A1* | 7/2014 | Marks .................. C08G 59/245 528/393 |
| 2014/0342144 A1* | 11/2014 | Nakayama ............... C08J 5/248 428/220 |
| 2015/0087748 A1* | 3/2015 | Marks .................. C08G 59/027 523/400 |
| 2016/0237282 A1* | 8/2016 | Shimura .................. G03F 7/00 |
| 2016/0297972 A1* | 10/2016 | Mori ...................... B05D 3/007 |
| 2017/0267809 A1 | 9/2017 | Meyer et al. |
| 2018/0071946 A1* | 3/2018 | Lindner .................. B27N 3/005 |

* cited by examiner

EPOXY COMPOSITIONS AND METHODS OF USE

REFERENCE TO RELATED APPLICATIONS

This application claims the benefit of and priority to U.S. Provisional Patent Application No. 62/688,535 filed on Jun. 22, 2018, the entirety of which is incorporated herein.

FIELD

Described herein are epoxy compositions, and in particular, epoxy compositions suitable for coating or marking a substrate, such as a roadway.

BACKGROUND

Epoxy compositions and particularly two-part epoxy compositions have been used for coating and marking substrates, such as a roadway surface. Such compositions are generally supplied as a Part A epoxide component and a Part B amine component, and each component may be pumped separately through a pump and then sprayed on the substrate surface.

Conventional two-part epoxy compositions for marking of substrate surfaces may gel and coat pump seals, and in some cases, may cause a pump to overheat, seize, and/or fail. Pump failure results in down-time in order for the pump to be cleaned and for seals to be replaced. Thus, there is a need for compositions that reduce or eliminate the instances of pump failure while retaining the necessary properties for substrate marking, such as an epoxy coating that cures within a short period of time.

SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Various embodiments of the present invention provide two-part epoxy compositions that are suitable for substrate marking. Also, described herein are embodiments that provide methods for applying and using two-part epoxy compositions.

In one aspect, epoxy compositions suitable for marking or coating a substrate are described herein. In some examples, the epoxy composition contains a first part having an epoxide; a second part having an amine; and a latent cure catalyst. In some cases, the latent cure catalyst comprises at least one toluene sulfonate ester. In some examples, the latent cure catalyst is present in the first part. In some examples, the first part further comprises a dry time accelerator. In some examples, the dry time accelerator comprises a multifunctional meth(acrylate).

In some cases, the epoxy compositions described herein can have a No-Pick-Up Time of less than or equal to about 30 minutes, as measured by ASTM D711-10. In some cases, the epoxy compositions can have a pump operating time of greater than 5 hours, as measured by a Harsh Pump Test.

In some examples, the epoxide comprises a diglycidyl ether. In some cases, the epoxide comprises one or more of bisphenol A diglycidyl ether or bisphenol F diglycidyl ether.

In some examples, the amine comprises an aliphatic or a cycloaliphatic amine. In some cases, the amine comprises one or more of diethylene triamine (DETA), triethylene tetramine (TETA), tetraethylene pentamine (TEPA), 4-methylcyclohexane-1,3-diamine; 2-methylcyclohexane-1,3-diamine4-methylcyclohexane-1,3-diamine; 2-methylcyclohexane-1,3-diamin 3-aminomethyl-3,5,5-trimethylcyclohexylamine; 1,8, methane diamine; 3,3-dimethylmethylene-di(cyclohexylamine); methylene-di(cyclohexylamine); and 1,2-cyclohexanediamine.

In some examples, the latent cure catalyst includes at least one toluene sulfonate ester. In some cases, the latent cure catalyst comprises one or more of methyl p-toluene sulfonate, ethyl p-toluene sulfonate, and p-toluene sulfonic anhydride. In some cases, the latent cure catalyst comprises at least one aliphatic sulfonate ester. In some instances, the latent cure catalyst comprises methyl p-toluene sulfonate.

In some examples, the latent cure catalyst is present in an amount less than or equal to 8 weight percent, based on the total weight of the composition. Optionally, in some examples, a multifunctional (meth)acrylate is also present in the composition. In some cases, the latent cure catalyst is present in the composition in an amount less than or equal to 8 weight percent, and the multifunctional (meth)acrylate is present in the composition in an amount less than or equal to 12 weight percent based on the total weight of the composition. In some examples, the multifunctional (meth) acrylate is present in the composition in an amount less than or equal to 4 weight percent, based on the total weight of the composition.

In another aspect, a first part of a two part epoxy composition is described. The first part contains an epoxide; a multifunctional (meth)acrylate; and a latent cure catalyst comprising at least one toluene sulfonate ester. In some cases, the first part further comprises a pigment.

In still another aspect, methods of applying an epoxy composition to a substrate are described. The methods can include the steps of: providing a first part containing an epoxide; providing a second part containing an amine; pumping the first part through a first pump and the second part through a second pump into a mixing chamber or a mixing tube to create an epoxy composition; and applying the epoxy composition to a substrate; wherein the first part further comprises a latent cure catalyst comprising at least one toluene sulfonate ester. Optionally, in some examples of the method, the first part further comprises a multifunctional (meth)acrylate.

In some examples of the method, the composition has a No-Pick-Up Time of less than or equal to about 30 minutes, as measured by ASTM D711-10. In some examples of the method, the first pump comprises a first pump rod operating at a first pump rod temperature, and the first pump rod temperature remains at or below about 150° F. for at least 24 hours of continuous pumping, as measured by a Harsh Pump Test. In some examples of the method, the first pump comprises a first pump rod operating at a first pump rod temperature, and the first pump rod temperature remains at or below about 150° F. for at least 5 hours of continuous pumping, as measured by a Harsh Pump Test. In some examples of the method, the substrate comprises asphalt, concrete, stone, or a mixture thereof. In some examples of the method, the epoxy composition is a substrate marking composition. In some examples of the method, the epoxy composition further comprises ceramic or glass beads.

In some examples of the method, the method further includes the step of applying a layer of ceramic or glass beads on the epoxy composition after it has been sprayed on the substrate. In some examples of the method, the beads are operable to reflect an incident light beam or light source. In some examples of the method, the incident light beam is retroreflected. In some cases, the incident light beam is reflected toward the source of the incident light beam at an angle of 30°, as measured from the surface of the substrate.

These and other embodiments of the present invention are described in greater detail in the Detailed Description that follows.

DETAILED DESCRIPTION OF THE INVENTION

Embodiments of the present invention relate generally to two-part epoxy compositions that are suitable for substrate marking, and methods for using the two-part epoxy compositions.

Definitions and Descriptions

The terms "invention," "the invention," "the present invention," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

ASTM D711 is a road marking industry test. The version published in 2010 "ASTM D711-10" is used throughout the specification.

"EMS" is an acronym for ethyl methanesulfonate (CAS No. 62-50-0)

"EPTS" is an acronym for ethyl p-toluenesulfonate, (CAS No. 80-40-0).

"MPTS" is an acronym for methyl p-toluenesulfonate, (CAS No. 80-48-8).

"MMS" is an acronym for methyl methanesulfonate, (CAS No. 66-27-3).

"TMPTA" is an acronym for trimethylolpropane triacrylate, $C_{15}H_{20}O_6$ (CAS No. 15625-89-5).

A substrate marking composition may be used to provide coverage of or markings on an underlying substrate. The markings may convey information (e.g., traffic flow information and safety information) to persons and/or machines regarding the substrate or the movement of objects along the substrate. In some cases, the markings may be decorative. Some non-limiting examples of substrates include pavement, roads, parking lots, parking decks, parking blocks, traffic blocks, ramps, bridges, airport runways, docks, tunnels, sidewalks, parks, plazas, green spaces, decorative spaces, floor surfaces, walls, ceilings, and doors. Typical but non-limiting examples of substrate materials include asphalt, concrete, and cement. Typical but non-limiting examples of information conveyed by the substrate marking composition include linear delineation and horizontal surface signage, such as locations of airport taxiways, hold position, geographic position, vehicle roadway, aprons, ramps, and aircraft parking and tie downs; the locations of road edges, road center lines, stop sign lines, pedestrian crossings, school zones, speed bumps, and railroad crossings; the location of and traffic flow through road intersections; the location of preferential lanes such as high occupancy vehicle lanes, bicycle lanes, bus lanes, and pedestrian lanes; rights of way between motorists, cyclists and pedestrians; rights of way between aircraft; the location of airport runway lanes and airport gates; the spatial limits of parking spaces; speed limits; and directional instructions such as arrows.

Non-limiting examples of decorative markings include school spirit markings comprising a school name, logo, and/or mascot; and similar markings for corporations and other entities. A non-limiting example of a marking that is both informative and decorative includes a pedestrian crossing that is marked in a decorative pattern, such as a floral pattern or a multicolored stripe pattern.

Optionally, the substrate may be coated or marked with a primer or adhesion promoter, and then coated or marked with a substrate marking composition.

Although these markings are often termed "road markings" or "roadway markings," a person of ordinary skill will realize that any markable substrate may be marked by such road or roadway markings.

The term (meth)acrylate encompasses both acrylates and methacrylates.

Two-Part Epoxy Compositions

Epoxy compositions can often be formed, at a minimum, from an epoxide part (Side A or first part) and a hardener part (Side B or second part), which are mixed immediately prior to use. The epoxide part can include a chemical entity comprising one or more epoxide moieties, while the hardener can include a chemical entity comprising a variety of moieties that react with the epoxide moieties, such as an amine moiety, an acid moiety, or an alcohol moiety. These two parts form a cured epoxy composition via chemical reactions between epoxide moieties and epoxide-reactive moieties. In some cases, a dry time accelerator is incorporated to facilitate the chemical reaction and decrease the cure time, which can also be called a hardening time. A cured epoxy composition is hardened through a highly cross-linked polymer network that is formed upon curing of the two parts. The dry time accelerator can often be a multifunctional (meth)acrylate. Other additives, such as colorants and reflective beads, may be added to the epoxy compositions. In some cases, additives generally known in the art for improving abrasion resistance may be employed in this system. On such example includes a polymer wax.

Cured epoxy compositions are durable, and are often used for substrate coating or marking applications, such as pavement marking and traffic paint applications. Epoxy compositions used in pavement marking applications must be able to meet a number of rigorous performance requirements, including weatherability, abrasion resistance, flowability, and adhesion to road surfaces under changing temperature and pavement surface conditions. In addition to these properties, it is particularly desirable that the epoxy composition hardens or cures to a track-free state in a short time after application, so that the duration of road closures during initial pavement marking, road maintenance, or repair is as short as possible. It is desirable to avoid unsightly "tracking" of the newly applied epoxy composition that could occur if a vehicle tire runs over an epoxy composition that is insufficiently cured. Fast curing epoxy compositions are desirable so that the substrate to which the marking composition is applied may be used soon after application, thereby minimizing disruption to traffic and providing a reduction in unsightly tire tracking arising as a result of traffic crossing over insufficiently cured road markings.

As detailed further below, many substrate marking epoxy compositions are applied to substrates such as roads using a high-pressure pump and spray system. Pumps are utilized to convey the first part (Side A) and the second part (Side B) to a mixing chamber or tube. The two parts can be mixed via pumping through an impingement mixing chamber and then sprayed on a substrate, such as a road, through a spray nozzle. In other cases, the two parts may be mixed in a static mix tube and then sprayed on the substrate through a spray nozzle.

In some cases, trimethylolpropane triacrylate (TMPTA) and/or other multifunctional (meth)acrylates are conventionally used as dry time accelerators to increase the hardening rate of an epoxy composition. The presence of a dry time accelerator such as a (meth)acrylate, which may be included in the first epoxide part, may beneficially increase the hardening rate of the mixture of the two parts; however, in some cases, it can negatively affect pump operating time.

In particular, a buildup of polymer may occur on the spray pump seals, for example, when TMPTA is present in a sufficient amount. In some cases, pump buildup can cause the temperature of the pump rod to increase, and in certain cases, the increasing temperature can increase pump buildup which causes pump failure by overheating, seal ruptures, or pump stopping. In some cases, the seals are one or more fluoropolymer washers, such as PTFE washers. In other cases, the seal materials comprise ultra-high molecular weight polyethylene (UHMWPE), polyether ether ketone (PEEK), or leather. Any conventional seal or washer material may be used.

Embodiments described herein surprisingly provide epoxy compositions that provide fast-hardening compositions while reducing occurrences of pump failure. The epoxy compositions described herein substitute or partially substitute a latent cure catalyst such as a toluene sulfonate ester for the multifunctional (meth)acrylate to reduce pump failure while maintaining the requisite properties of epoxy compositions for substrate marking, such as a No-Pick-Up Time of less than about 30 minutes according as measured by ASTM D711.

In some embodiments, the epoxy compositions have a first part containing an epoxide, a second part containing an amine, and a latent cure catalyst comprising at least one toluene sulfonate ester.

In some examples, suitable components for the first part may include, but are not limited to, a monomeric, oligomeric, or polymeric epoxide compound. In general, the epoxide compounds have, on average, more than one epoxide unit per molecule. An "epoxide" or "epoxide compound," for the purposed of this application, is any compound containing at least one epoxide moiety, such as Formula (I):

The $R_a$-$R_d$ groups may be aliphatic, cycloaliphatic, aromatic, cyclic, heterocyclic or mixtures thereof. The $R_a$-$R_d$ groups may be saturated or unsaturated. The $R_a$-$R_d$ groups may be substituted or unsubstituted. Bi-function epoxide compounds such as diglycidyl ethers, which have two epoxide moieties per molecule, are suitable. In formula (I), $R_{a-d}$ may be independently selected from hydrogen; any alkyl, such as methyl, ethyl, propyl, butyl; $C_5$-$C_{12}$ alkyl; $C_{12}$-$C_{28}$ alkyl; or greater that $C_{28}$ alkyl. The alkyl groups may be linear or branched, and may be substituted or unsubstituted. Substituents include, but are not limited to, halogen, additional epoxide moieties, ether moieties, ester moieties, acyl moieties, aliphatic moieties (which may themselves have substituents), and amide moieties.

Some specific examples of suitable epoxides for the first part include $C_4$-$C_{28}$ alkyl glycidyl ethers; $C_2$-$C_{28}$ alkyl- and alkenyl-glycidyl esters; $C_1$-$C_{28}$ alkyl-, mono- and polyphenol glycidyl ethers; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; sorbitol glycidyl ethers and combinations thereof. An extensive list of epoxy resins useful in the present disclosure is found in Lee, H. and Neville, K., *Handbook of Epoxy Resins*, McGraw-Hill Book Company, New York, 1967, Chapter 2, pages 257-307; incorporated herein by reference.

In some examples, the first part may contain a mixture of several different epoxide molecules, oligomers, and/or polymers. In choosing epoxides, consideration should be given to properties of the final cured epoxy composition, and to viscosity and other properties that may influence the processing, pumping, and spraying characteristics of the epoxy composition, as well as the characteristics of the final cured epoxy composition. Non-limiting examples of preferred epoxide compounds useful in preparing the epoxy composition may include, for example, a bisphenol-A-based epoxide or a bisphenol-F-based epoxide such as diglycidyl ether of bisphenol A or diglycidyl ether of bisphenol F, respectively.

The amount of epoxide in the first part may be, for example, from more than zero weight % (wt %) to less than 100 wt %, preferably from about 35 wt % to about 95 wt %, from about 60 wt % to about 85 wt %, from about 70 wt % to about 85 wt %, from about 75 wt % to about 85 wt %, from about 75 wt % to about 82 wt %, or from about 72 wt % to about 87 wt %, based on the weight of the first part composition.

The amount of epoxide in the total epoxy composition may be, for example, from more than zero weight % (wt %) to less than 100 wt %, from about 0.1 wt % to about 95 wt %, from about 5 wt % to about 80 wt %, from about 10 wt % to about 70 wt %, from about 15 wt % to about 60 wt %, from about 20 wt % to about 50 wt %, or from about 55 wt % to about 65 wt %, based on the weight of the total epoxy composition.

Suitable components for the second part may include a variety of moieties that react with the epoxide moieties, such as an amine moiety, and acid moiety, or an alcohol moiety. The second part of the present compositions may include any common amine, including multifunctional amines. Specific examples of suitable amines include, but are not limited to, diethylene triamine (DETA), triethylene tetramine (TETA), tetraethylene pentamine (TEPA), 4-methylcyclohexane-1,3-diamine; 2-methylcyclohexane-1,3-diamine4-methylcyclohexane-1,3-diamine; 2-methylcyclohexane-1,3-diamin 3-aminomethyl-3,5,5-trimethylcyclohexylamine; 1,8, methane diamine; 3,3-dimethylmethylene-di(cyclohexylamine); methylene-di(cyclohexylamine); 1,2-cyclohexanediamine; and mixtures thereof; polyether amine, a di-functional polyether amine; a tri-functional polyetheramine; and mixtures thereof; polyoxypropylene derivatives of varying molecular weight including di-functional amines of from about 200 to about 800 molecular weight; tri-functional amines of from about 200 to about 800 molecular weight; and mixtures thereof; ethylene amines (diethylene triamine, triethylene tetraamine, tetraethylene pentamine, and the like), propylene amines (dimethylaminopropylamine, diethylaminopropylamine, and the like), polyamidoamines (polyaminoimidizoline, and the like), alkyenediamines (hexamethylene diamene, methylpentamethylene diamene, and the like), alicyclic aliphatic amines (n-aminoethylpiperazine, and the like), araliphatic amines (metaxylenediamine, and the like); adducts of any of the aforementioned curing agents; and combinations thereof. For oligomers and polymers, molecular weight refers to number-average molecular weight (Mn), which is typically measured by Dynamic Light Scattering. A person of ordinary skill will appreciate that other amines may be used without departing from the spirit and scope of the invention.

The amount of amine in the second part may be, for example, from more than zero weight % (wt %) to less than 100 wt %, from about 10 wt % to about 95 wt %, from about 20 wt % to about 85 wt %, from about 20 wt % to about 70 wt %, from about 20 wt % to about 60 wt %, from about 20 wt % to about 50 wt %, or from about 25 wt % to about 35 wt %, based on the weight of the second part composition.

The amount of amine in the total epoxy composition may be, for example, from more than zero weight % (wt %) to less than 100 wt %, from about 10 wt % to about 60 wt %, from about 15 wt % to about 55 wt %, from about 20 wt % to about 50 wt %, from about 25 wt % to about 45 wt %, from about 10 wt % to about 20 wt %, or from about 5 wt % to about 10 wt %, based on the weight of the total epoxy composition.

In some cases, the volume ratio of the first part to the second part is about 2:1. In other cases, the volume ratio of the first part to the second part is about 3:1, about 2.5:1, about 1.75:1, about 1.5:1, or about 1:1.

In the compositions described herein, a latent cure catalyst is added in the first part or in the second part of the composition. In some cases, the latent cure catalyst may be added in both the first part and the second part.

For the purposes of this application, a toluene sulfonate ester can include any isomer or chemical derivative or variation of a toluene sulfonate ester, as shown in Formula (II):

In the case of a toluene sulfonate ester, $R_1$ is an aromatic group, generally a benzene derivative, that may be substituted with an alkyl, such as methyl, ethyl, propyl, butyl, $C_4$-$C_{12}$ hydrocarbon, $C_{12}$-$C_{18}$ hydrocarbon, or $C_{18}$-$C_{24}$ hydrocarbon. The alkyl groups may be linear or branched, saturated or unsaturated, and may be substituted or unsubstituted. Substituents include, but are not limited to, halogens, ether moieties, ester moieties, acyl moieties, aliphatic moieties, and amide moieties. In some cases, $R_1$ is toluyl, which may be ortho-, meta-, or para-substituted; and may be mono-, di, or tri-substituted. In some cases, $R_1$ further comprises a sulfonyl or sulfonate group.

In some cases, when the latent cure catalyst is an aliphatic sulfonate ester, $R_1$ has an aliphatic group (instead of an aromatic group) bonded to the sulfur atom. Suitable aliphatic groups include methyl, ethyl, propyl, butyl, $C_4$-$C_{12}$ hydrocarbon, $C_{12}$-$C_{18}$ hydrocarbon, or $C_{18}$-$C_{24}$ hydrocarbon. The aliphatic group may be linear or branched, may be saturated or unsaturated, and may be substituted or unsubstituted.

$R_2$ is an aromatic group or an aliphatic group as described for $R_1$. Non-limiting examples of $R_2$ include methyl, ethyl, propyl, butyl. In some cases $R_1$ and $R_2$ may be the same.

Some non-limiting examples of toluene sulfonate esters include Structures III-V below:

-continued (IV)

(V)

The latent cure catalyst useful in the present disclosure may include, for example, the latent cure catalysts derived from sulfonate esters described in WO 9518168, which is incorporated herein in its entirety. Specific examples may include the esters of sulfonic acids such as methyl p-toluenesulfonate, ethyl p-toluenesulfonate, methyl methanesulfonate, p-toluenesulfonic anhydride, other alkyl esters of sulfonic acid, or any combination thereof. In some examples, the latent cure catalyst may include for example the adducts of sulfonate esters or acids with epoxides including the adduct of p-toluenesulfonate esters or p-toluenesulfonic acids with bisphenol A diglycidyl ether. In some other examples, the latent cure catalyst may include for example ammonium salts of sulfonic acids such as ammonium triflate, tetramethylammonium triflate, or any combinations thereof. In still other examples, the latent cure catalyst may include esters of sulfuric acid such as dimethylsulfate, diethylsulfate, or combinations thereof, and/or esters of strong acids such as aryl or alkyl phosphonic acids, trichloroacetic acids, or trifluoroacetic acids. The esters useful in the invention may optionally contain also other chemical groups or substituents. Also molecules containing more than one ester group may be used such as for example the di(p-toluene sulfonate ester) of ethylene glycol.

Preferred latent cure catalyst compounds may include, for example, the esters of sulfonic acids such as methyl p-toluenesulfonate (MPTS), ethyl p-toluenesulfonate (EPTS), methyl methanesulfonate (MMS), ethyl methanesulfonate (EMS), p-toluenesulfonic anhydride, or any combination thereof.

In some examples, the latent cure catalyst may be present in the first part in an amount of up to about 20 wt %, up to about 10 wt %, or up to about 5 wt %. In some cases the latent cure catalyst is present in the first part in an amount of up to about 19 wt %, up to about 18 wt %, up to about 17 wt %, up to about 16 wt %, up to about 15 wt %, up to about 14 wt %, up to about 13 wt %, up to about 12 wt %, up to about 11 wt %, up to about 10 wt %, up to about 9 wt %, up to about 8 wt %, up to about 7 wt %, up to about 6 wt %, up to about 5 wt %, up to about 4 wt %, up to about 3 wt %, up to about 2 wt %, or up to about 1 wt %. In some examples, the latent cure catalyst may be present in an amount of no more than about 20 wt %, no more than about 19 wt %, no more than about 18 wt %, no more than about 17 wt %, no more than about 16 wt %, up to about 15 wt %, no more than about 14 wt %, no more than about 13 wt %, no more than about 12 wt %, no more than about 11 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, or no more than about 1 wt %, based on the total weight of the first part.

In some examples, the latent cure catalyst may be present in the epoxy composition an amount of up to about 20 wt %, up to about 19 wt %, up to about 18 wt %, up to about 17 wt %, up to about 16 wt %, up to about 15 wt %, up to about 14 wt %, up to about 13 wt %, up to about 12 wt %, up to about 11 wt %, up to about 10 wt %, up to about 9 wt %, up to about 8 wt %, up to about 7 wt %, up to about 6 wt %, up to about 5 wt %, up to about 4 wt %, up to about 3 wt %, up to about 2 wt %, or up to about 1 wt %. In some examples, the latent cure catalyst may be present in an amount of no more than about 20 wt %, no more than about 19 wt %, no more than about 18 wt %, no more than about 17 wt %, no more than about 16 wt %, up to about 15 wt %, no more than about 14 wt %, no more than about 13 wt %, no more than about 12 wt %, no more than about 11 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, or no more than about 1 wt %, based on the total weight of the epoxy composition.

In some embodiments, the epoxy compositions may optionally include a dry time accelerator known in the art. The dry time accelerator useful in the epoxy compositions may be selected, for example, from those dry time accelerators known in the art including, but not limited to, multifunctional (meth)acrylates, anhydrides, carboxylic acids, amine compounds, phenolic compounds, polymercaptans, or mixtures thereof or others known in the art.

In some examples, the first part of the epoxy composition further contains a multifunctional acrylate or methacrylate. Such multifunctional (meth)acrylates can be used in so-called "fast-cure" two-part epoxy compositions as dry time accelerators. In some cases, the presence of such multifunctional (meth)acrylates may lead to the gelation and pump failure problems detailed above, depending in part on the concentration of the multifunctional (meth)acrylates in the epoxy composition. In some examples, the multifunctional (meth)acrylate may comprise trimethylolpropane triacrylate (TMPTA). The chemical structure of TMPTA is shown in Formula (VI):

(VI)

Adding a latent cure catalyst as described herein allows for the use of a lower amount of multifunctional (meth)acrylates, or in some cases, for elimination of the multifunctional (meth)acrylates entirely, without sacrificing the fast curing times required for substrate marking applications. For example, when latent cure catalyst is used in combination with a multifunctional (meth)acrylates, the amount of multifunctional (meth)acrylates may be reduced by about 50%, by about 60%, by about 65%, by about 70%, by about 75%, by about 80%, by about 90%, by about 95%, or by about 99%. For example, when TMPTA is used in combination with MPTS, the amount of TMPTA may be reduced by about 75% (e.g., reduced from 16 wt % to 4 wt %, based on the weight of Part A). However, in some examples, the multifunctional (meth)acrylate may be eliminated entirely if a latent cure catalyst is present.

Other optional curing agents may be present, such as any co-reactive or catalytic curing materials known to be useful for curing epoxy compositions. Such co-reactive curing agents include, for example, polyamine, polyamide, polyaminoamide, dicyandiamide, polymeric thiol, polycarboxylic acid and anhydride, and any combination thereof or the like. Suitable optional catalytic curing agents include tertiary amine, quaternary ammonium halide, Lewis acids such as boron trifluoride, and any combination thereof or the like. Other specific examples of optional co-reactive curing agent include diaminodiphenylsulfone, styrene-maleic acid anhydride (SMA) copolymers and any combination thereof. Among the conventional co-reactive epoxy curing agents, amine, phenolic, and amino or amido-containing materials are preferred.

Generally, the amount of optional curing agent, when used in the present disclosure, may be for example, from greater than zero wt % to about 10 wt %, from about 0.1 to about 9 wt %, from about 2 to about 8 wt %, or from about 3 to about 7 wt % based on the total weight of the curing agent plus latent curing agent. The amount of optional curing agent, when present in the first part, may be up to about 10 wt %, up to about 5 wt %, up to about 4 wt %, up to about 3 wt %, up to about 2 wt %, or up to about 1 wt %, based on the weight of the first part composition. The visibility of compositions applied in substrate markings, and particularly of road markings, may be enhanced by the addition of pigments and/or beads. In some examples, the addition of pigments and/or beads increases the visibility of the substrate marking, particularly in low lighting conditions such as night time. The pigments may be any known in the art. In particular, titanium dioxide and Organic Yellow pigments may be useful for imparting color. In some cases, a Part A composition may comprise an epoxide in an amount of 75-82 wt %, and rutile $TiO_2$ pigment in an amount of 18-25 wt %, based on the weight of the Part A composition, and may have a white color. In some cases, a Part A composition may comprise an epoxide in an amount of 36-85 wt %, and rutile $TiO_2$ pigment in an amount of 15-40 wt %, based on the weight of the Part A composition, and may have a white color. In other cases, a Part A composition may comprise an epoxide in an amount of 72-87 wt %, Organic Yellow pigment in an amount of 5-10 wt %, and rutile $TiO_2$ pigment in an amount of 8-18 wt %, based on the weight of the Part A composition, and may have a yellow color. In some cases, a Part A composition may comprise an epoxide in an amount of 46-92 wt %, Organic Yellow pigment in an amount of 3-10 wt %, and rutile $TiO_2$ pigment in an amount of 5-20 wt %, based on the weight of the Part A composition, and may have a yellow color.

In some examples, the epoxy composition further comprises reflective and/or high friction elements. In some cases, these elements comprise ceramic or glass beads. In some cases, a layer of elements may be placed on an epoxy composition after it has been sprayed on the substrate as a marking. In other cases, the elements may be mixed with the epoxy composition before use in substrate marking applications. In some examples, the beads are coated with or formed from a reflective material and are operable to reflect an incident light beam or light source. In some examples, the incident light beam is retroreflected. In other words, a specular reflection is reflected towards the source of the incident light beam at an angle of 30° as measured from the surface of the substrate. Traffic marking compositions often include retro-reflective elements, such as glass beads (for example, AASHTO M 247, Type 1 and Type 4), ceramic or glass microspheres (for example, as provided by 3M, Anhui Tory Materials Technology, Geveko, and other companies). In addition, the epoxy compositions may comprise high friction elements such as calcined bauxite, corundum, taconite, basalt, emery, flint silica, granite, silica, and steel slag.

One of ordinary skill would recognize that the addition of beads would not affect the differences in hardening rate demonstrated between the different systems, and that epoxy compositions having retro-reflective beads typically demonstrate shorter No-Pick-Up Times than comparable composition that does not have glass beads.

The performance characteristics of the epoxy compositions described herein relate to fast cure times and lack of buildup in a pump, as described further in the Examples section below. Pump problems associated with the presence of the multifunctional (meth)acrylate may be reduced or eliminated without loss of a fast cure time of the epoxy compositions. In some examples, the epoxy composition has a No-Pick-Up Time of less than or equal to about 30 minutes. For example, the presently described epoxy composition may have a No-Pick-Up Time of less than 45 minutes (min), less than 40 min, less than 38 min, less than 36 min, less than 35 min, less than 34 min, less than 33 min, less than 32 min, less than 30 min, less than 29 min, less than 28 min, less than 27 min, less than 26 min, less than 25 min, less than 24 min, less than 23 min, less than 22 min, less than 21 min, less than 20 min, less than 19 min, less than 18 min, less than 17 min, less than 16 min, less than 15 min, less than 14 min, less than 13 min, less than 12 min, less than 10 min, or less than 5 min.

In some cases, improved pumping characteristics of the epoxy composition of the present disclosure can be described as "pump operating time." Pump operating time is the amount of time that the pump in a Harsh Pump Test (described below) can operate continuously until slowing by at least 20% or stopping. For example, a pump operating at 100 revolutions per minute will have slowed by at least 20% when it slows to operating at 80 revolutions per minute. In some cases, the epoxy compositions described herein can have a No-Pick-Up Time of less than or equal to about 30 minutes, as measured by ASTM D711-10. In some cases, the epoxy compositions can have a pump operating time of greater than 5 hours at a pump rod temperature of less than 150° F., as measured by a Harsh Pump Test. In some examples, the epoxy composition has a pump operating time of greater than 8 hours, greater than 12 hours, greater than 20 hours, greater than 24 hours, greater than 36 hours, greater than 48 hours, or greater than 72 hours at a pump rod temperature of below about 150° F. While pump operating times in the Harsh Pump Test may vary from pump operating times in field use of epoxy application systems, a person of ordinary skill in the art will understand that the Harsh Pump Test is a reliable predictor of field performance.

In other aspects, a first part of a two part epoxy composition may comprise an epoxide; a multifunctional (meth) acrylate; and a latent cure catalyst comprising least one toluene sulfonate ester. Any of the examples of epoxide, dry time accelerator, and latent cure catalyst as described more thoroughly above may be used.

Methods of Use

Two-part epoxy compositions are frequently used in substrate coating or marking applications, such a marking edges, center stripes, and turn lanes of roads, as described above. Many substrate marking epoxy compositions are applied to roadways using a high-pressure pump and spray system. Pumps are utilized to convey the first part (Side A) and the second (Side B) part to the mixing device for the two parts; the device can comprise a mixing chamber or tube. The two parts can be mixed via pumping through a mixing chamber (for example, an impingement mixing chamber) and then applied to a substrate by spraying on the substrate through a spray nozzle. In other cases, the two parts may be mixed in a static mix chamber, with no Side A or Side B chamber, and then sprayed on the road through a spray nozzle.

In yet another aspect of the disclosure, methods of applying an epoxy composition are disclosed herein. The methods may include the steps of providing a first part comprising an epoxide; providing a second part comprising an amine; pumping the first part through a first pump and the second part through a second pump into a mixing chamber or a mixing tube to create an epoxy composition; and applying the epoxy composition on a substrate. In some such methods, the first part of the two-part epoxy composition further includes a latent cure catalyst comprising at least one toluene sulfonate ester. Any of the examples of epoxide, amine, and latent cure catalyst described herein may be used.

In some cases, applying step may be carried out with each of the first part (Part A) and the second part (Part B) at a temperature of about 90-160° F., or more preferably at a temperature of about 100-140° F. In other cases, the applying step may be carried out at a temperature of about 100-150° F., about 110-140° F., or about 120-130° F. The pressure from the pump to spray nozzle may be in the range of about 1500-3500 psi, about 1800-3200 psi, or about 2000-3000 psi. In some examples, the pump operates at a temperature of 100-140° F. In some examples, the first part further comprises a multifunctional (meth)acrylate. Any of the examples of multifunctional (meth)acrylates or other dry time accelerators described above may be used. In some cases, the composition has a No-Pick-Up time of less than or equal to about 30 minutes, as measured by ASTM D711-10.

In some examples, the pump includes a pump rod operating at a pump rod temperature. The improved pumping characteristics of the epoxy composition of the present disclosure can be demonstrated with pump rod temperature. In two-part epoxy pumping steps, the pump rod temperature may increase if the first part fluid gels or builds up on the pump seals. In some embodiments, the pump rod temperature remains at or below about 150° F. for at least 24 hours of continuous pumping. In some examples, the pump rod temperature remains at or below about 150° F. for at least 12 hours, at least 18 hours, at least 24 hours, at least 36 hours, at least 48 hours, at least 72 hours, or at least 96 hours of continuous pumping.

Although many substrates may be marked with the epoxy compositions, in some examples the substrate is a roadway. The roadway may be constructed of asphalt, concrete, stone, any particulate bound in a plastic or resin, or mixtures thereof. In some cases, the roadway substrate is asphalt or concrete.

The road surface will be at ambient temperature before the application of the marking. In some cases, the ambient temperature may be about 20° F., about 30° F., about 40° F., about 50° F., about 60° F., about 70° F., about 80° F., about 90° F., or about 100° F. In some cases, the road surface will be at an ambient temperature about 20° F. to about 40° F., about 40° F. to about 60° F., 60° F. to about 80° F., or about 80° F. to about 110° F.

The invention will be illustrated through the following series of specific embodiments. However, it will be understood by one of skill in the art that many other embodiments are contemplated by the principles of the invention.

EXAMPLES

Two comparative epoxy compositions and two inventive epoxy compositions were prepared below as illustrative substrate marking compositions. The substrate marking compositions each have a Part A epoxide part and a Part B amine part. The Part A epoxide component contains Bisphenol A Diglycidyl Ether (CAS-No. 25085-99-8) and pigments in the same proportions as the Side A portion of HPS-2, which is commercially available from Ennis-Flint, Inc. (Greensboro, NC).

A catalyst or catalyst system was selected for the two comparative epoxy compositions (Examples 1 and 2) and two inventive epoxy compositions (Examples 3 and 4). The selected latent cure catalyst/dry time accelerator (MPTS/TMPTA) components were mixed with Part A. The Part B amine component is the Side B portion of HPS-2, which is commercially available from Ennis-Flint, Inc. (Greensboro, NC).

The Part A epoxide (after the adding of the selected catalyst system) and the Part B amine were mixed in a 2:1 ratio by volume, with MPTS and TMPTA added according to Table 1. The amounts reported in weight percent in Table 1 are based on the weight of the first part composition.

TABLE 1

| MPTS/TMPTA Systems for Example Compositions | | |
|---|---|---|
| | MPTS (wt %) | TMPTA (wt %) |
| Example 1 (Comparative) | 0 | 0 |
| Example 2 (Comparative) | 0 | 16 |
| Example 3 (Inventive) | 3 | 4 |
| Example 4 (Inventive) | 4 | 0 |

The epoxy compositions were tested as described in more detail below. The following analytical equipment and methods are used in the Examples:

ASTM D711-10—"No-Pick-Up" Time

No-Pick-Up Time is determined using ASTM D711-10 using a plate glass panel at a ret film thickness of 0.38±0.01 mm (15±0.5 mils) and allowed to dry in a horizontal position under the laboratory conditions specified: 23±2 degrees Centigrade (73.5±3.5° F.) and 50±5% relative humidity. A No-Pick-Up Time of 30 minutes or less is optimal for substrate marking compositions without the inclusion of drop-on beads. The No-Pick-Up Time recorded according to ASTM D711-10 is unbeaded and does not include other retro-reflective or friction elements.

Harsh Pump Test

The pump system is assembled with clean parts and new seals to manufacturer specification. Fifty (50) gallons of the Part A epoxide part is heated in an insulated drum to a predetermined temperature by circulating glycol. Then the pump operates at a predetermined pressure and cycle rate until the pump slows or stops, or is voluntarily shut down. Temperature, pressure, and cycle rate data are recorded throughout the test.

Figure 1:
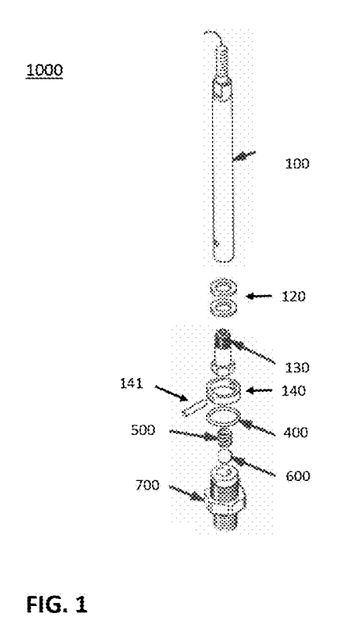
FIG. 1 is an exploded diagram of a pump rod with seals that can be used according to embodiments described.

FIG. 1 depicts a pump rod used in the Harsh Pump Test. The pump rod 100 fits into one or more fluoropolymer washers 120 which act as seals. Bolt 130 is attached to male connector 700 via ring 140 and pin 141. O-ring 400 secures the fit between bolt 130 and male connector 700 via spring 500 and ball bearing 600.

Figure 2A:
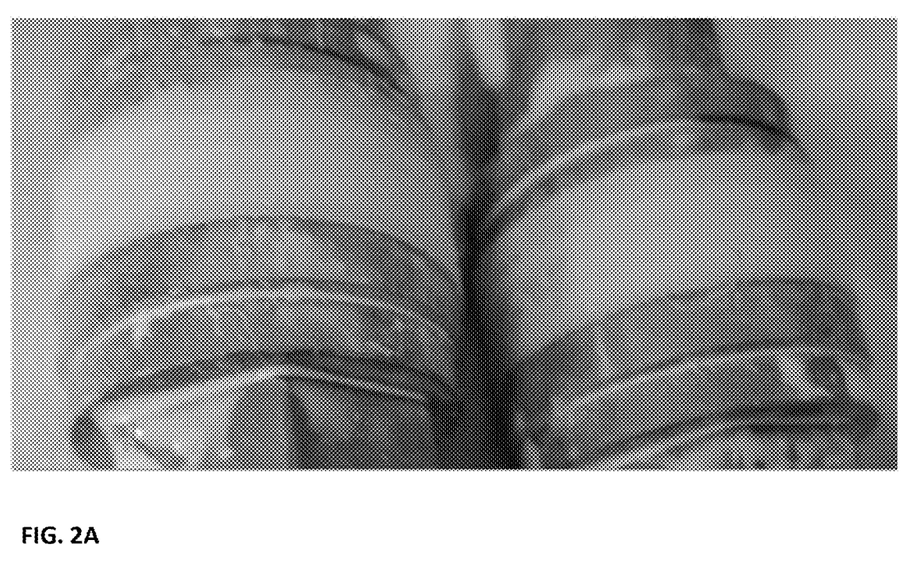
FIG. 2A is a photograph of pump seals that are clean after the Harsh Pump Test.
Figure 2B:
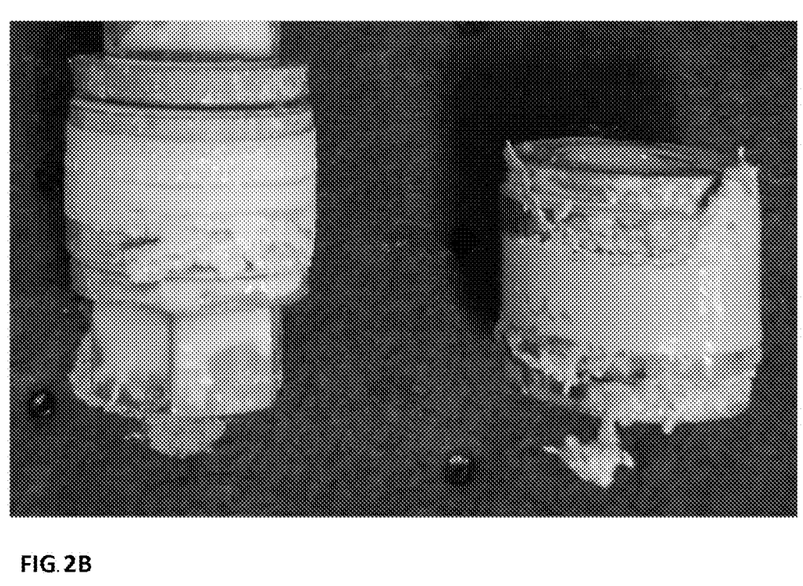
FIG. 2B is a photograph of pump seals that show visible buildup after pump failure in the Harsh Pump Test.
Figure 2C:
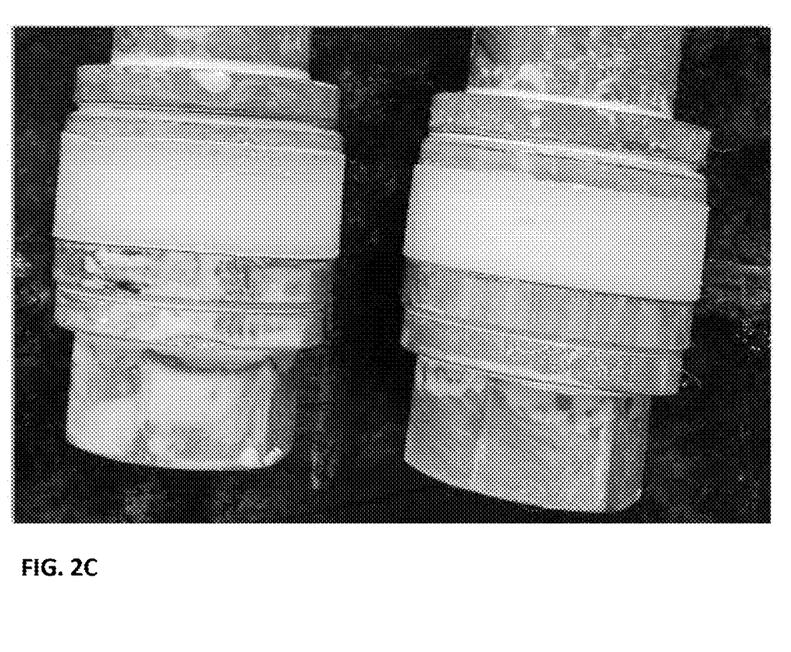
FIG. 2C is a photograph of pump seals that are clean after the Harsh Pump Test.
Figure 2D:
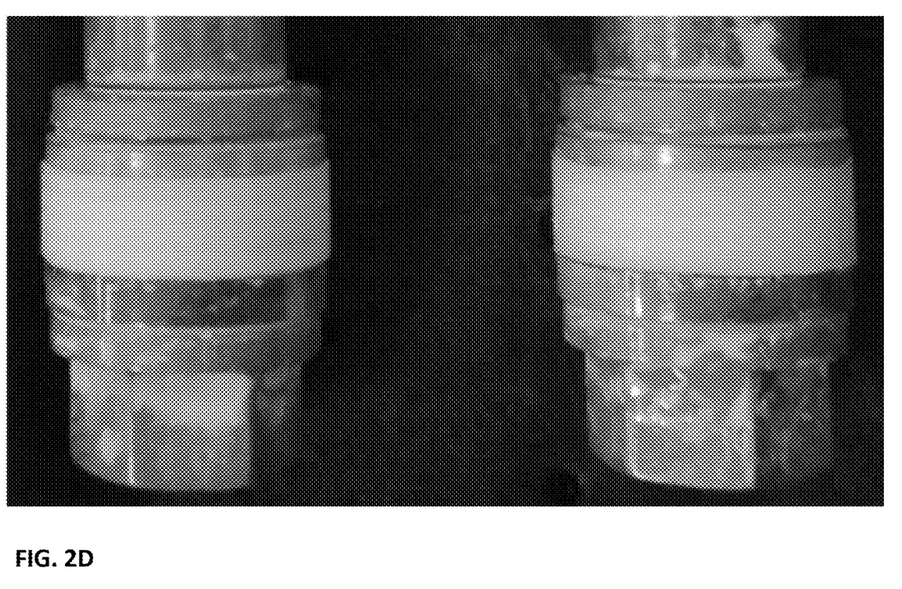
FIG. 2D is a photograph of pump seals that are clean after the Harsh Pump Test.

The results of ASTM D711-10 and the Harsh Pump Test for the four example compositions are reported in Table 2. Visual inspections of the seal conditions were made after the Harsh Pump Test to determine whether the seals were "clean" or showed "buildup." FIG. 2A is a photograph of the clean seals for Example 1. FIG. 2B is a photograph of the buildup on seals for Example 2. FIG. 2C is a photograph of the clean seals for Example 3. FIG. 2D is a photograph of the clean seals for Example 4.

TABLE 2

Test Results

| | MPTS (wt %) | TMPTA (wt %) | D711 No-Pick-Up Time (min) | Pump Operation without failure (hours) | Seal Condition after Harsh Pump Test |
|---|---|---|---|---|---|
| Example 1 | 0 | 0 | 47 | 24+ | clean |
| Example 2 | 0 | 16 | 28 | 5 | buildup |
| Example 3 | 3 | 4 | 28 | 24+ | clean |
| Example 4 | 4 | 0 | 30 | 24+ | clean |

Comparative Example 1

Comparative Example 1 was prepared to demonstrate a conventional slow curing traffic marking that is provided as a composition containing an epoxide part and an amine part, to which no multifunctional (meth)acrylates or latent cure catalysts are added. The "slow cure" Comparative Example 1 exhibits a No-Pick-Up Time of 47 minutes. When the epoxy composition was tested in a Harsh Pump Test, the pump performed without any issues and was able to operate for 24+ hours before it was voluntarily shut down. After voluntary shutdown, the condition of the pump seals after testing were reported as clean, having essentially no buildup of material that is visible to the naked eye without magnification on the pump seals. The pump rod temperature remained below 150° F. throughout the test.

Comparative Example 2

Comparative Example 2 was prepared to demonstrate a conventional fast curing traffic marking that is provided as a composition containing an epoxide part, which included 16 wt % of TMPTA, and an amine part. The "fast cure" Comparative Example 2 exhibits a No-Pick-Up Time of 28 minutes. When the epoxy composition was tested in a Harsh Pump Test, the pump was able to operate for approximately 5 hours before equipment failure requiring maintenance. The condition of the pump seals and high pressure filter after testing were observed to have buildup (gelling) that nearly covers the surface of the seals and clogs the filter, which is directly related to the significant decrease in pump stability. The pump rod temperature increased to 200-300° F. during pumping as buildup formation caused overheating of the pump.

Inventive Example 3

Example 3 shows improved pump characteristics using the MPTS catalyst at 3 wt % in combination with the TMPTA catalyst at 4 wt % compared to Comparative Example 2, which contains TMPTA at 16 wt % in an analogous formulation. Example 3 exhibits a No-Pick-Up Time of 28 minutes. In a Harsh Pump Test, the pump performed without any issues, and was able to operate for 24+ hours before the equipment was voluntarily shut down. After voluntary shutdown, the condition of the pump seals after testing were reported as clean, having essentially no buildup of material that is visible to the naked eye without magnification on the pump seals. The pump rod temperature remained below 150° F. throughout the test.

Inventive Example 4

Example #4 shows improved pump characteristics using the MPTS latent cure catalyst at 4 wt % compared to Comparative Example 2, which contains TMPTA at 16 wt % in an analogous formulation. Example 4 exhibits a No-Pick-Up Time of 30 minutes. In a Harsh Pump Test, the pump performed without any issues, and was able to operate for 24+ hours before the equipment was voluntarily shut down. After voluntary shutdown, the condition of the pump seals after testing were reported as clean, having essentially no buildup of material that is visible to the naked eye without magnification on the pump seals. The pump rod temperature remained below 150° F. throughout the test.

The inventive samples showed improved performance on No-Pick-Up Time and the Harsh Pump Test, while still meeting the additionally required performance tests including Hardness (ASTM D-2240), Yellowness Index (ASTM E-313), Adhesion to Concrete (ASTM D-7234), Abrasion Resistance (ASTM D-4060), Tensile Strength (ASTM D-638), and Compressive Strength (ASTM D-695).

Illustration 1 is an epoxy composition suitable for coating a substrate, comprising a first part comprising an epoxide; a second part comprising an amine; and a latent cure catalyst.

Illustration 2 is the epoxy composition of any preceding or subsequent illustration, wherein the latent cure catalyst comprises at least one toluene sulfonate ester.

Illustration 3 is the epoxy composition of any preceding or subsequent illustration, wherein the latent cure catalyst comprises methyl p-toluenesulfonate.

Illustration 4 is the epoxy composition of any preceding or subsequent illustration, wherein the latent cure catalyst is present in the first part.

Illustration 5 is the epoxy composition of any preceding or subsequent illustration, wherein the first part further comprises a multifunctional (meth)acrylate.

Illustration 6 is the epoxy composition of any preceding or subsequent illustration, wherein the epoxy composition has a No-Pick-Up Time of less than or equal to about 30 minutes, as measured by ASTM D711-10.

Illustration 7 is the epoxy composition of any preceding or subsequent illustration, wherein at least one of the epoxy composition, the first part, or the second part has a pump operating time of greater than 5 hours, as measured by a Harsh Pump Test.

Illustration 8 is the epoxy composition of any preceding or subsequent illustration, wherein the epoxide comprises a diglycidyl ether.

Illustration 9 is the epoxy composition of any preceding or subsequent illustration, wherein the epoxide comprises one or more of bisphenol A diglycidyl ether or bisphenol F diglycidyl ether.

Illustration 10 is the epoxy composition of any preceding or subsequent illustration, wherein the amine comprises an aliphatic or a cycloaliphatic amine.

Illustration 11 is the epoxy composition of any preceding or subsequent illustration, wherein the amine comprises one or more of diethylene triamine (DETA), triethylene tetramine (TETA), tetraethylene pentamine (TEPA), 4-methylcyclohexane-1,3-diamine; 2-methylcyclohexane-1,3-diamine4-methylcyclohexane-1,3-diamine; 2-methylcyclohexane-1,3-diamin 3-aminomethyl-3,5,5-trimethylcyclohexylamine; 1,8, methane diamine; 3,3-dimethylmethylene-di(cyclohexylamine); methylene-di(cyclohexylamine); and 1,2-cyclohexanediamine.

Illustration 12 is the epoxy composition of any preceding or subsequent illustration, wherein the latent cure catalyst comprises at least one aromatic sulfonate ester.

Illustration 13 is the epoxy composition of any preceding or subsequent illustration, wherein the latent cure catalyst comprises two or more of methyl p-toluene sulfonate, ethyl p-toluene sulfonate, and p-toluene sulfonic anhydride.

Illustration 14 is the epoxy composition of any preceding or subsequent illustration, wherein the latent cure catalyst comprises at least one aliphatic sulfonate ester.

Illustration 15 is the epoxy composition of any preceding or subsequent illustration, wherein the latent cure catalyst is present in in an amount less than or equal to 8 weight percent, based on the total weight of the composition.

Illustration 16 is the epoxy composition of any preceding or subsequent illustration, wherein the latent cure catalyst is present in the composition in an amount less than or equal to 8 weight percent and the multifunctional (meth)acrylate is present in the composition in an amount less than or equal to 12 weight percent based on the total weight of the composition.

Illustration 17 is the epoxy composition of any preceding or subsequent illustration, wherein the multifunctional (meth)acrylate is present in the composition in an amount less than or equal to 4 weight percent, based on the total weight of the composition.

Illustration 18 is a first part of a two part epoxy composition, comprising: an epoxide; a dry time accelerator comprising a multifunctional (meth)acrylate; and a latent cure catalyst comprising at least one toluene sulfonate ester.

Illustration 19 is a method of applying an epoxy composition, comprising the steps of: providing a first part comprising an epoxide; providing a second part comprising an amine; pumping the first part through a first pump and the second part through a second pump into a mixing chamber or a mixing tube to create an epoxy composition; and applying the epoxy composition to a substrate; wherein either the first part, the second part, or both the first and second parts further comprise a latent cure catalyst comprising at least one toluene sulfonate ester.

Illustration 20 is the method of any preceding or subsequent illustration, wherein the first part further comprises a multifunctional (meth)acrylate.

Illustration 21 is the method of any preceding or subsequent illustration, wherein, wherein the composition has a No-Pick-Up Time of less than or equal to about 30 minutes, as measured by ASTM D711-10.

Illustration 22 is the method of any preceding or subsequent illustration, wherein the first pump comprises a first pump rod operating at a first pump rod temperature, and wherein the first pump rod temperature remains at or below about 150° F. for at least 24 hours of continuous pumping, as measured by a Harsh Pump Test.

Illustration 23 is the method of any preceding or subsequent illustration, wherein the substrate comprises asphalt, concrete, stone, or a mixture thereof.

Illustration 24 is the method of any preceding or subsequent illustration, wherein the epoxy composition is a substrate marking composition.

Illustration 25 is the method of any preceding or subsequent illustration, wherein further comprising the step of placing a layer of ceramic or glass beads on the epoxy composition.

Illustration 26 is the method of any preceding or subsequent illustration, wherein the beads are operable to reflect an incident light beam or light source.

Illustration 27 is the method of any preceding or subsequent illustration, wherein wherein the incident light beam is retro-reflected.

Illustration 28 is the method of any preceding or subsequent illustration, wherein the incident light beam is reflected towards the source of the incident light beam at an angle of 30° as measured from the surface of the substrate.

Various embodiments of the invention have been described herein. It should be recognized that these embodiments are merely illustrative of the present invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated or otherwise clearly contradicted by context.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

What is claimed is:

1. A two part epoxy composition suitable for coating a substrate, comprising:
    a first part comprising an epoxide, wherein the epoxide comprises a diglycidyl ether or a polyglycidyl ether;
    a second part comprising an amine;
    a latent cure catalyst comprising at least one toluene sulfonate ester, wherein the latent cure catalyst is present in the composition in an amount from 1 weight percent to 20 weight percent based on the total weight of the composition; and
    a dry time accelerator comprising a multifunctional (meth)acrylate, wherein the multifunctional (meth)acrylate is present in the first part and the multifunctional (meth)acrylate is present in the composition in an amount less than or equal to 8 weight percent based on the total weight of the composition,
    wherein the composition does not include a cycloaliphatic amine and is devoid of a polyol, and wherein the composition comprises a plurality of beads.

2. The composition of claim 1, wherein the latent cure catalyst comprises methyl p-toluenesulfonate.

3. The composition of claim 1, wherein the latent cure catalyst is present in the first part.

4. The composition of claim 1, wherein the epoxy composition has a No-Pick-Up Time of less than or equal to about 30 minutes, as measured by ASTM D711-10.

5. The composition of claim 1, wherein at least one of the epoxy composition, the first part, or the second part has a pump operating time of greater than 5 hours, as measured by a Harsh Pump Test.

6. The composition of claim 1, wherein the latent cure catalyst comprises two or more of methyl p-toluene sulfonate, ethyl p-toluene sulfonate, and p-toluene sulfonic anhydride.

7. The composition of claim 6, wherein the latent cure catalyst comprises at least one aliphatic sulfonate ester.

8. The composition of claim 1, wherein the latent cure catalyst is present in in an amount from 1 weight percent to 8 weight percent, based on the total weight of the composition.

9. The composition of claim 1, wherein the multifunctional (meth)acrylate is present in the composition in an amount less than or equal to 4 weight percent, based on the total weight of the composition.

10. The composition of claim 1, wherein the latent cure catalyst comprises methyl p-toluenesulfonate,
wherein the latent cure catalyst is present in the composition in an amount from 1 weight percent to 8 weight percent, based on the total weight of the composition, and
wherein the multifunctional (meth)acrylate is present in the composition in an amount less than or equal to 4 weight percent, based on the total weight of the composition.

11. The composition of claim 1, wherein the substrate comprises a roadway.

12. The composition of claim 1, wherein the plurality of beads comprises reflective beads, ceramic beads, glass beads, or a combination thereof.

13. A first part of a two part epoxy composition, comprising:
an epoxide comprising a diglycidyl ether or a polyglycidyl ether;
a dry time accelerator comprising a multifunctional (meth)acrylate, the multifunctional (meth)acrylate being present in an amount less than or equal to 4 weight percent based on the total weight of the first part of a two part epoxy composition; and
a latent cure catalyst comprising at least one toluene sulfonate ester, the at least one toluene sulfonate ester being present in an amount less than or equal to 4 weight percent based on the total weight of the first part of a two part epoxy composition,
wherein the two part epoxy composition does not include a cycloaliphatic amine,
wherein the two part epoxy composition is devoid of a polyol, and wherein the composition comprises a plurality of beads.

14. A method of applying an epoxy composition, comprising the steps of:
providing a first part comprising the first part of claim 13;
providing a second part comprising an amine;
pumping the first part through a first pump and the second part through a second pump into a mixing chamber or a mixing tube to create an epoxy composition; and
applying the epoxy composition to a substrate.

15. The method of claim 14, wherein the composition has a No-Pick-Up Time of less than or equal to about 30 minutes, as measured by ASTM D711-10.

16. The method of claim 14, wherein:
the first pump comprises a first pump rod operating at a first pump rod temperature, and
wherein the first pump rod temperature remains at or below about 150° F. for at least 24 hours of continuous pumping, as measured by a Harsh Pump Test.

17. The method of claim 14, further comprising the step of
placing a layer of ceramic or glass beads on the epoxy composition.

18. The method of claim 17, wherein the beads are operable to reflect an incident light beam or light source.

19. The first part of a two-part epoxy composition of claim 13, wherein the latent cure catalyst comprises methyl p-toluenesulfonate.

20. The first part of a two-part epoxy composition of claim 13, wherein the latent cure catalyst comprises two or more of methyl p-toluene sulfonate, ethyl p-toluene sulfonate, and p-toluene sulfonic anhydride.

* * * * *